US008880932B2

(12) United States Patent
Guay et al.

(10) Patent No.: US 8,880,932 B2
(45) Date of Patent: Nov. 4, 2014

(54) SYSTEM AND METHOD FOR SIGNALING DYNAMIC RECONFIGURATION EVENTS IN A MIDDLEWARE MACHINE ENVIRONMENT

(71) Applicant: Oracle International Corporation, Redwood Shores, CA (US)

(72) Inventors: Wei Lin Guay, Penang (MY); Bjørn Dag Johnsen, Oslo (NO); David Brean, Boston, MA (US); Sven-Arne Reinemo, Baerums Verk (NO)

(73) Assignee: Oracle International Corporation, Redwood Shores, CA (US)

( * ) Notice: Subject to any disclaimer, the term of this patent is extended or adjusted under 35 U.S.C. 154(b) by 130 days.

(21) Appl. No.: 13/649,689

(22) Filed: Oct. 11, 2012

(65) Prior Publication Data
US 2013/0124910 A1    May 16, 2013

Related U.S. Application Data

(60) Provisional application No. 61/560,189, filed on Nov. 15, 2011.

(51) Int. Cl.
*G06F 11/00* (2006.01)
*G06F 11/14* (2006.01)

(52) U.S. Cl.
CPC ........ *G06F 11/1423* (2013.01); *G06F 11/1482* (2013.01); *G06F 2201/815* (2013.01)
USPC .......................................... 714/4.1; 714/4.11

(58) Field of Classification Search
CPC ........................................................ G06F 11/07
USPC ........... 714/4.1, 4.11, 4.12, 4.2, 5.1, 6.3, 38.1
See application file for complete search history.

(56) References Cited

U.S. PATENT DOCUMENTS

| | | | | |
|---|---|---|---|---|
| 6,088,721 A * | 7/2000 | Lin et al. | ......................... | 709/214 |
| 6,308,282 B1 * | 10/2001 | Huang et al. | ................... | 714/4.3 |
| 7,051,098 B2 * | 5/2006 | Masters et al. | ................ | 709/224 |
| 7,634,683 B2 * | 12/2009 | De La Cruz et al. | ........... | 714/4.1 |
| 7,970,918 B2 * | 6/2011 | Thompson et al. | ........... | 709/230 |

* cited by examiner

*Primary Examiner* — Dieu-Minh Le
(74) *Attorney, Agent, or Firm* — Meyer IP Law Group

(57) ABSTRACT

A system and method can provide fault tolerance in a middleware machine environment. A subnet manager can determine whether there is a path record change when a fault occurs in the middleware machine environment. Furthermore, the subnet manager can signal a dynamic reconfiguration event to at least one host in the middleware machine environment. The at least one host can send a message to the subnet manager to query for a latest path record. Then, the subnet manager can provide a latest path record to the at least one host.

20 Claims, 7 Drawing Sheets

SYSTEM AND METHOD FOR SIGNALING DYNAMIC RECONFIGURATION EVENTS IN A MIDDLEWARE MACHINE ENVIRONMENT

CLAIM OF PRIORITY

This application claims the benefit of priority on U.S. Provisional Patent Application No. 61/560,189, entitled "SYSTEM AND METHOD FOR SIGNALING DYNAMIC RECONFIGURATION EVENTS IN A MIDDLEWARE MACHINE ENVIRONMENT" filed Nov. 15, 2011, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to providing fault tolerance in a middleware machine environment.

BACKGROUND

The interconnection network plays a beneficial role in the next generation of super computers, clusters, and data centers. High performance network technology, such as the InfiniBand (IB) technology, is replacing proprietary or low-performance solutions in the high performance computing domain, where high bandwidth and low latency are the key requirements. For example, IB installations are used in supercomputers such as Los Alamos National Laboratory's Roadrunner, Tex. Advanced Computing Center's Ranger, and Forschungszentrum Juelich's JuRoPa.

IB was first standardized in October 2000 as a merge of two older technologies called Future I/O and Next Generation I/O. Due to its low latency, high bandwidth, and efficient utilization of host-side processing resources, it has been gaining acceptance within the High Performance Computing (HPC) community as a solution to build large and scalable computer clusters. The de facto system software for IB is OpenFabrics Enterprise Distribution (OFED), which is developed by dedicated professionals and maintained by the OpenFabrics Alliance. OFED is open source and is available for both GNU/Linux and Microsoft Windows.

SUMMARY

Described herein is a system and method that can provide fault tolerance in a middleware machine environment. A subnet manager can determine whether there is a path record change when a fault occurs in the middleware machine environment. Furthermore, the subnet manager can signal a dynamic reconfiguration event to at least one host in the middleware machine environment. The at least one host can send a message to the subnet manager to query for a latest path record. Then, the subnet manager can provide a latest path record to the at least one host.

DETAILED DESCRIPTION

Fault tolerance in an interconnected network become more important as the industry moving to large scale systems. Due to the size of the installations, old approaches such as checkpoint/restart approach become highly inflexible and ineffective.

In accordance with an embodiment of the invention, a scalable method for signaling reconfiguration events can be used together with different routing algorithms in a fault tolerance context. This method can be independent of topology and routing algorithm, and it can be further extended to cover host-side reconfiguration for virtualization, QoS, traffic aware routing, etc.

Figure 1:
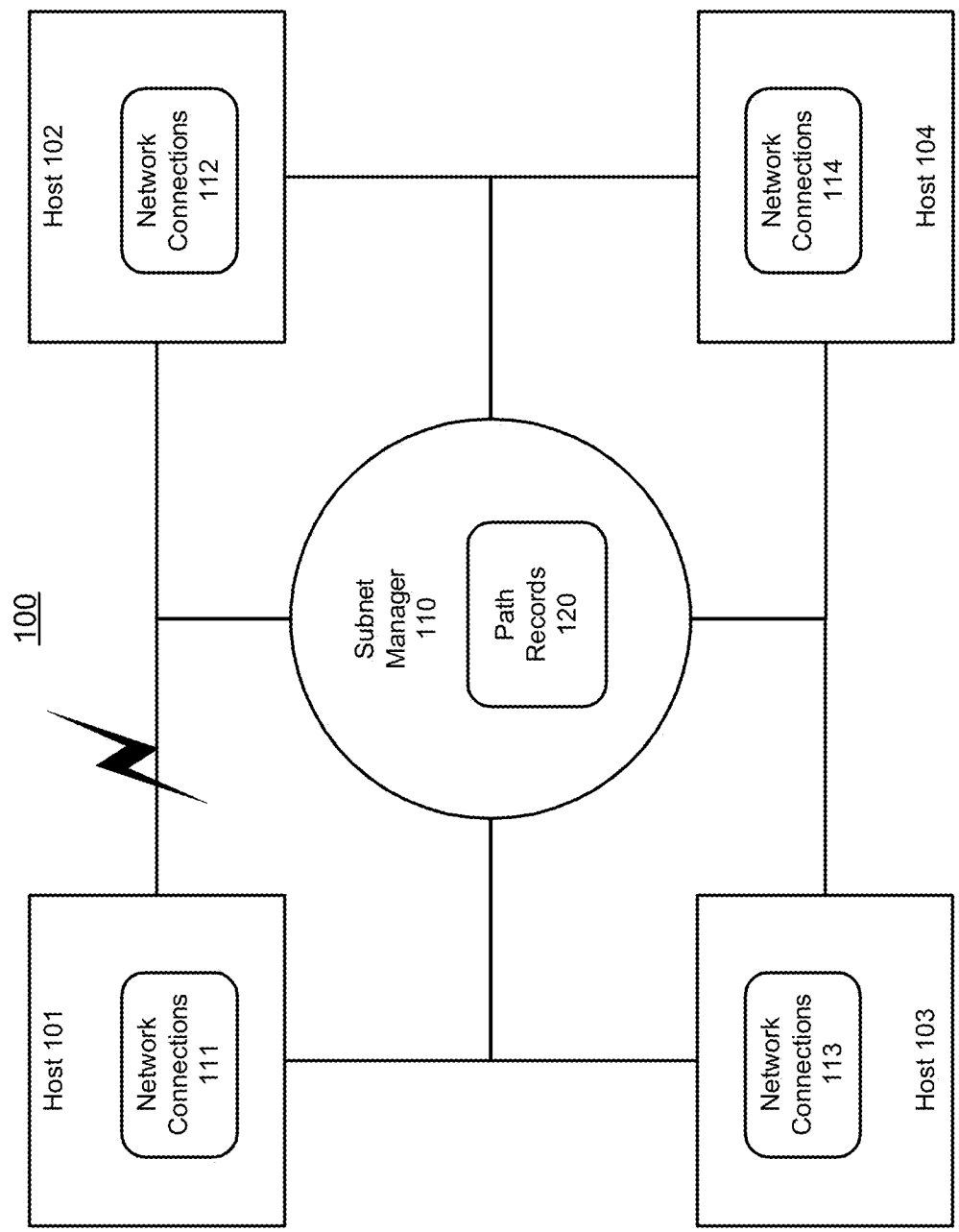
FIG. 1 shows an illustration of a middleware machine environment that provides fault tolerance, in accordance with an embodiment of the invention.

FIG. 1 shows an illustration of a middleware machine environment that provides fault tolerance, in accordance with an embodiment of the invention. As shown in FIG. 1, a subnet manager (SM) 110 for a subnet 100 in the middleware machine environment can trigger network reconfiguration when the SM 110 discovers a change or a fault occurring in the subnet network. The subnet manager can determine whether there is a change on the path record 120, e.g. using a path recorder distinguisher. Then, the SM 110 can signal a dynamic reconfiguration event to hosts 101-104 in the subnet network, if a path record change is identified. Subsequently, the hosts 101-104 can dynamically reconfigure the network connection 111-114, such as changing addressing state information of the network connection, without having to interrupt the connections and stop communication.

In accordance with an embodiment of the invention, an application transparent reconfiguration to support fault tolerance in a middleware machine environment can include a network reconfiguration phase, a signaling phase, and a host reconfiguration phase. After the SM 110 initializes and starts up the subnet, hosts 101-104 can subscribe for any events that they would like to be notified about before the subnet 100 enters normal operation. The SM can trigger the network reconfiguration phase after discovering a change in the network. When the network configuration is completed and new routing tables are distributed, the SM 110 can trigger the signaling phase where a message, such as a repath trap, can be forwarded to the hosts 101-104 that subscribes to this event. At the host, the reception of the repath trap triggers the host reconfiguration phase.

The network reconfiguration can be based on existing reconfiguration mechanisms. The host stack can dynamically reconfigure the network connections based on feedback from the SM whenever the topology changes. Moreover, the system can preserve the network connections without interrupting the running applications.

Different signaling methods can be employed to reduce the reconfiguration latency. The number of switches and hosts, and the number of active network connections can lead to a huge increase in the host reconfiguration latency, when a simple signaling method based on topology changes is used. The signaling methods can be based on the path record changes rather than the topology changes, since a topology change may not reflect path record changes.

Figure 2:
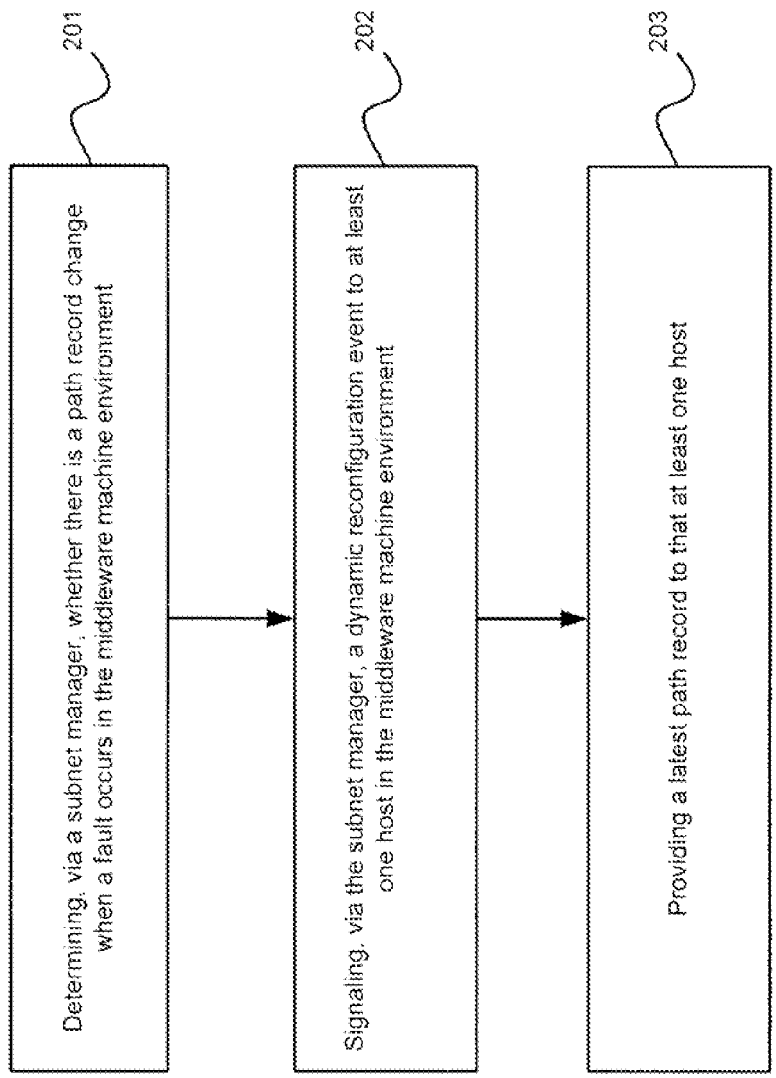
FIG. 2 illustrates an exemplary flow chart for providing fault tolerance in a middleware machine environment, in accordance with an embodiment of the invention.

FIG. 2 illustrates an exemplary flow chart for providing fault tolerance in a middleware machine environment, in accordance with an embodiment of the invention. As shown in FIG. 2, at step 201, a subnet manager can determine whether there is a path record change when a fault occurs in the middleware machine environment. Then, at step 202, the subnet manager can signal a dynamic reconfiguration event to at least one host in the middleware machine environment. Finally, at step 203, the subnet manager can provide a latest path record to the host.

InfiniBand (IB) Architecture

In accordance with an embodiment of the invention, fault tolerance can be provided in the InfiniBand (IB) architecture, which is a serial point-to-point technology. Each of the IB networks, or subnets, can include a set of hosts interconnected using switches and point-to-point links. A single subnet is scalable to more than ten-thousand nodes and two or more subnets can be interconnected using an IB router. The hosts and switches within a subnet are addressed using local identifiers (LIDs), e.g. a single subnet is limited to 48151 unicast addresses.

An IB subnet can employ at least one subnet manager (SM) which is responsible for initializing and starting up the subnet including the configuration of all the IB ports residing on switches, routers and host channel adapters (HCAs) in the subset. At the time of initialization, the SM starts in the discovering phase where the SM does a sweep of the network in order to discover all switches and hosts. During the discovering phase, the SM may also discover any other SMs present and negotiate who should be the master SM. When the discovering phase is completed, the SM can enter a master phase. In the master phase, the SM proceeds with LID assignment, switch configuration, routing table calculations and deployment, and port configuration. At this point, the subnet is up and ready to use.

After the subnet is configured, the SM can monitor the network for changes (e.g. a link goes down, a device is added, or a link is removed). If a change is detected during the monitoring process, a message (e.g. a trap) can be forwarded to the SM and the SM can reconfigure the network. Part of the reconfiguration process, or a heavy sweep process, is the rerouting of the network which can be performed in order to guarantee full connectivity, deadlock freedom, and proper load balancing between all source and destination pairs.

The HCAs in an IB network can communicate with each other using Queue Pairs (QPs). A QP is created during the communication setup, and a set of initial attributes such as QP number, HCA port, destination LID, queue sizes, and transport service are supplied. On the other hand, the QP associated with the HCAs in a communication is destroyed when the communication is over. An HCA can handle many QPs, each QP consists of a pair of queues, a Send Queue (SQ) and a Receive Queue (RQ). There is one such pair present at each end-node that is participating in the communication. The send queue holds work requests to be transferred to the remote node, while the receive queue holds information on what to do with the data received from the remote node. In addition to the QPs, each HCA can have one or more Completion Queues (CQs) that are associated with a set of send and receive queues. The CQ holds completion notifications for the work requests posted to the send and receive queue.

The Subnet Administrator (SA) is a subnet database associated with the master SM to store different information about a subnet. The communication with the SA can help the end-node to establish a QP by sending a general service management datagram (MAD) through a designated QP, e.g. QP1. Both sender and receiver require information such as source/destination LIDs, service level (SL), MTU, etc. to establish a QP. This information can be retrieved from a data structure known as a path record that is provided by the SA. In order to obtain a path record, the end-node can perform a path record query to the SA, e.g. using the SubnAdmGet/SubnAdmGetable operation. Then, the SA can return the requested path records to the end-node.

The SM is also responsible for monitoring the network for changes using Subnet Management Agents (SMAs) that are presented in every switch and/or every HCA. The SMAs communicate changes, such as new connections, disconnections, and port state change, to the SM using traps and notices.

A trap is a message sent to alert end-nodes about a certain event. A trap can contain a notice attribute with the details describing the event. Different traps can be defined for different events, e.g. the port state changed trap (trap number 128) can be sent from a switch to the SM whenever there is a change in the port state on one of the switch ports, i.e. a port has been connected or disconnected. If the SM receives the port state changed trap indicating that a switch port has lost the connection to an end-node, the SM can reconfigure the subset. In addition, the SM can generate an out of service trap (trap number 65) which indicates that the given end-node is unavailable. This trap can be redirected from the SM to the SA in order to forward it out to all end-nodes that have subscribed to this trap.

In order to reduce the unnecessary distribution of traps, IB applies an event forwarding mechanism where end-nodes are required to explicitly subscribe to the traps they want to be informed about. In the above example, the trap may only be forwarded out by the SA if the end-node is subscribed to trap number 65.

In accordance with an embodiment of the invention, fault tolerance in a middleware machine environment can be based on the methods for detecting and signaling network changes in IB architecture. The system can provide additional support for the necessary traps and notices required for reconfiguration. The middleware machine environment can include a plurality of switches in a fat-tree topology, and a plurality of nodes, such as server nodes, that connect to the leaf switches in the fat-tree topology.

The LASH routing algorithm can be used in the IB architecture as one of the deterministic and topology-agnostic routing engines. The LASH routing algorithm uses virtual lanes (VLs) as a deadlock avoidance mechanism. Each virtual lane can have a direct one-to-one mapping with the service levels (SLs). The applications used with the LASH routing algorithm can perform a path record query to get the path SL for each QP. Otherwise, the default SL is used and a deadlock might happen.

Host-side reconfiguration can be used to update the path record attribute on a QP whenever a fault happens. A major challenge with the LASH routing algorithm is that the assigned SL for a given path might change after a failure. For example, the LASH routing algorithm can be used for the routing of a 3×2 mesh, using a single VL, VL0, to avoid deadlock while maintaining shortest-path routing in the subnet. When a failure happens, the 3×2 mesh can be changed into a 6-node ring. Two VLs, VL0 and VL1, are needed in order to have deadlock-free and shortest-path routing in a 6-node ring. Since the initial path record query that is performed by the application are based on a 3×2 mesh where each node only uses VL0, the SM is aware that the topology has changed into a 6-node ring and triggers LASH to regenerate a new routing table. If there is no mechanism available to notify the nodes to modify their existing QPs with the updated SL, all nodes continue to send packets on VL0, and eventually each of them ends up waiting for credits, which leads to deadlock after rerouting.

Signaling Method

In accordance with an embodiment of the invention, different signaling mechanisms can be used by the subnet manager to facilitate dynamic updates of routing information that impacts connection states for network connections.

Figure 3:
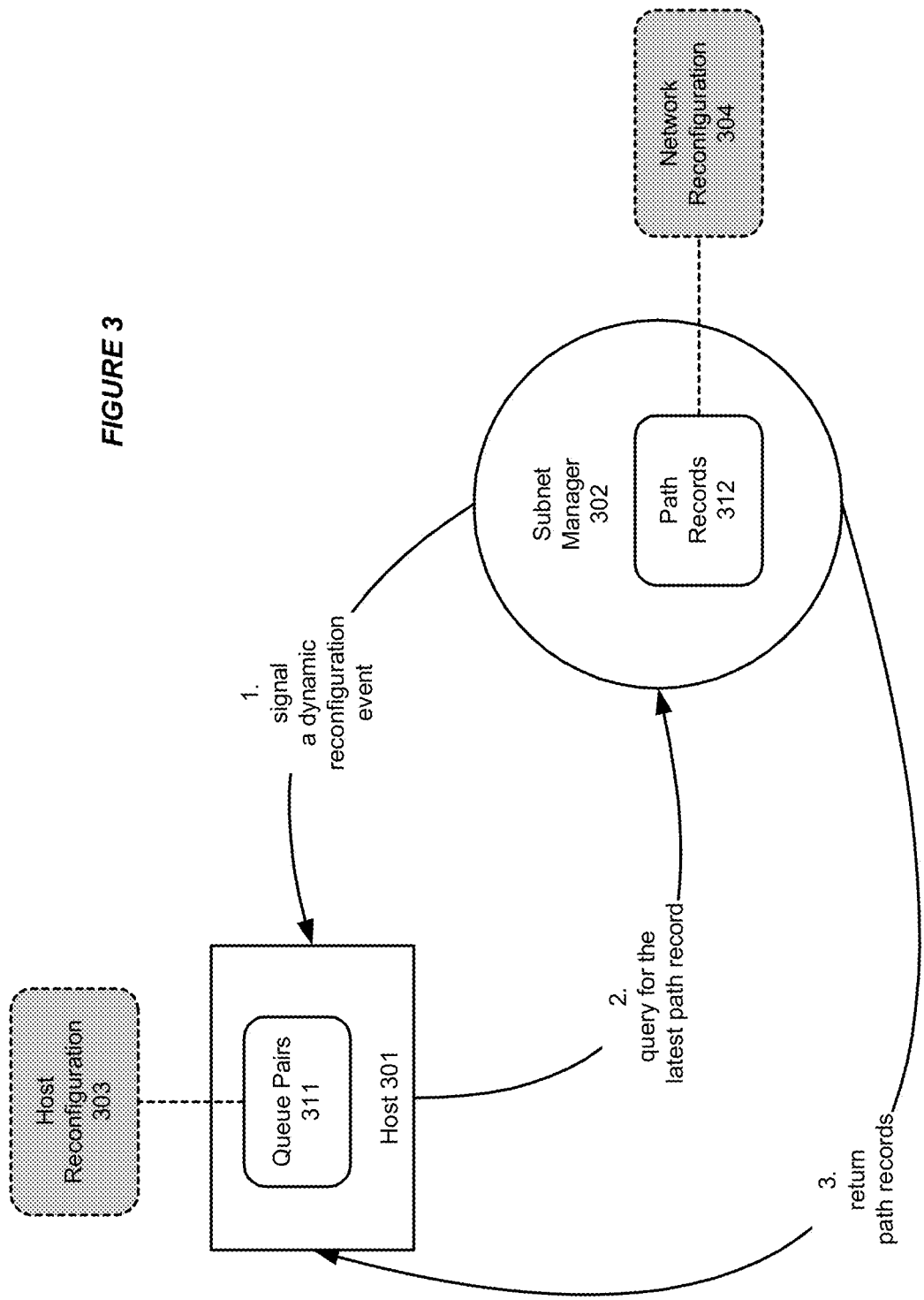
FIG. 3 shows an illustration of signaling dynamic reconfiguration events in a middleware machine environment using a three-way wildcard handshake approach, in accordance with an embodiment of the invention.

FIG. 3 shows an illustration of signaling dynamic reconfiguration events in a middleware machine environment using a three-way wildcard handshake approach, in accordance with an embodiment of the invention. Firstly, the SM 302 forwards out a repath trap to notify the host 301 that there is a change in the subnet topology due to a network reconfiguration 304. Secondly, the host 301 can construct a message to query the SM 302, or the SA, for the latest path records. Finally, the SM 302 returns the path records in-bulk, e.g. using the Reliable Multi-Packet Transaction Protocol (RMPP), to allow the host 301 performing necessary host reconfiguration 303 on network connections such as QPs 311.

Using the three-way wildcard handshake approach, the SM 302 may not be able to identify the updated paths when the subnet has changed. This can cause the SM 302 to always trigger the repath trap for all hosts when a fault happens and can create unnecessary overhead on the host stack 301 if no updates are necessary. On the other hand, the implementation of the three-way handshaking mechanism is simple, e.g. it may only require minimum modification to a SM implementation such as OpenSM.

Figure 4:
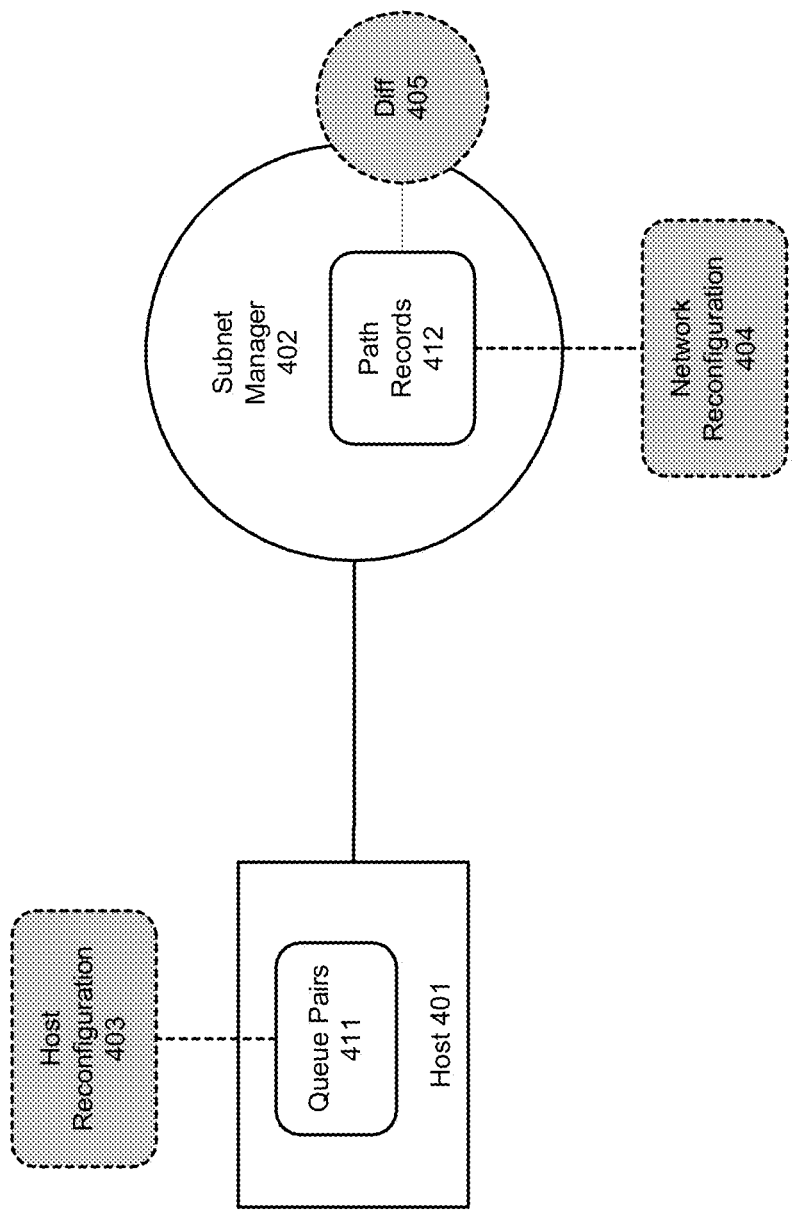
FIG. 4 shows an illustration of signaling dynamic reconfiguration events in a middleware machine environment using a repath-only approach, in accordance with an embodiment of the invention.

FIG. 4 shows an illustration of signaling dynamic reconfiguration events in a middleware machine environment using a repath-only approach, in accordance with an embodiment of the invention. As shown in FIG. 4, when a SM 402 detects a change in the subnet topology due to a network reconfiguration 403, the SM 402 sends the path records 412 to the host 401 for performing necessary host reconfiguration 403 on network connections, such as QPs 411. The repath-only approach uses a path record distinguisher (PRD), e.g. a Diff method 405 associated with the SM 402, to differentiate between the new and the old paths. The Diff method 405 is based on an algorithm, e.g. Algorithm 1 as shown below.

Algorithm 1 Trigger repath trap with path record

1:    if never_been_routed = = TRUE then
2:        for $sw_{src} = 0$ to max_switches do
3:            for $sw_{dst} = 0$ to max_switches do Algorithm 1 Trigger repath trap with path record 4:                $OLD\_VL[sw_{src}][sw_{dst}] = VL[sw_{src}][sw_{dst}]$
5:            end for
6:        end for
7:    else
8:        for $sw_{src} = 0$ to max_switches do
9:            for $sw_{dst} = 0$ to max_switches do
10:                if $sw_{src} \mathrel{!=} sw_{dst}$ AND $OLD\_VL[sw_{src}][sw_{dst}]$
                    $\mathrel{!=} VL[sw_{src}][sw_{dst}]$ then
11:                    construct_repath_trap($sw_{src}, sw_{dst}$)
12:                    trigger(repath_trap)
13:                    $OLD\_VL[sw_{src}][sw_{dst}] = VL[sw_{src}][sw_{dst}]$
14:                end if
15:            end for
16:        end for
17:    end if Algorithm 1 can identify the path changes and trigger a repath trap with an updated path record. As shown in the above, the never_been_routed flag determines whether the OLD_VL array has been assigned with values. If they are assigned, the algorithm compares the path changes between the OLD_VL array and the VL array. If the path record for a source/destination address pair has changed, Algorithm 1 constructs a dedicated repath trap which includes an updated path record and forwards it to the affected source and destination pair. Then, this algorithm updates the OLD_VL array accordingly. This solution is straightforward and does not involve any handshaking, but its scalability depends on the total number of path record changes.

The repath-only approach as shown in FIG. 4 is different from the three-way handshaking approach as shown in FIG. 3. Using the three-way handshaking approach, the repath trap is only used as a method to notify the host stack when there is a change in the subnet topology, whereas the repath-only approach depends on the repath mechanism, where every repath trap includes an updated path record.

Figure 5:
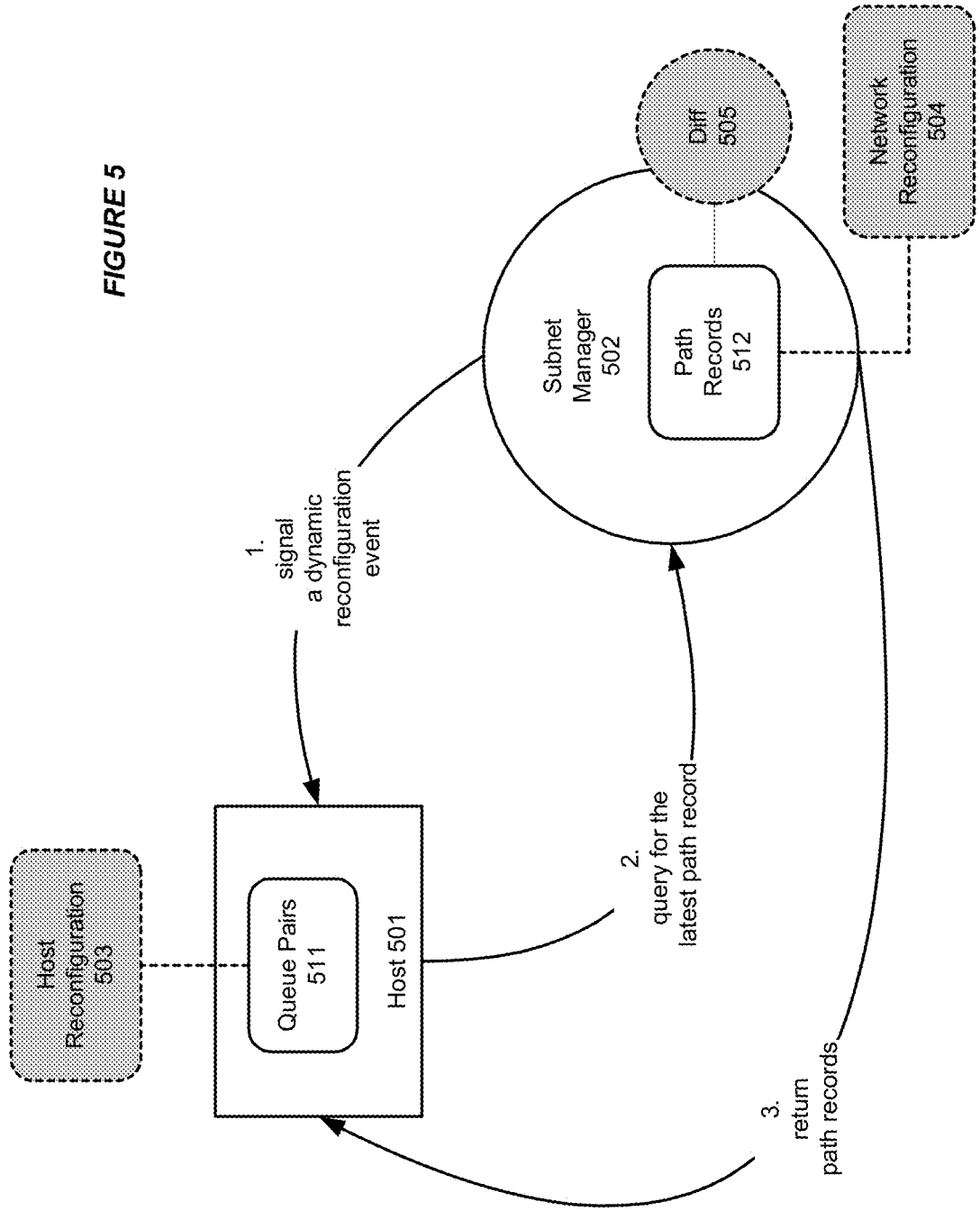
FIG. 5 shows an illustration of signaling dynamic reconfiguration events in a middleware machine environment using a three-way hybrid handshake approach, in accordance with an embodiment of the invention.

FIG. 5 shows an illustration of signaling dynamic reconfiguration events in a middleware machine environment using a three-way hybrid handshake approach, in accordance with an embodiment of the invention. As shown in FIG. 5, a SM 502 can guarantee to notify a host 501 when there is a change in the subnet topology causing a change on the path record 512, e.g. due to a network reconfiguration 504. The SM 502 can use a PRD, such as a Diff method 505 associated with the SM 502, to differentiate between the new and the old paths. Additionally, the three-way hybrid handshake mechanism can forward the updated path records in bulk, which provide scalability in terms of the total number of path record changes.

When the host 501 receives a repath trap, the host 501 knows that the network is reconfigured and can query the SM 502 for the updated path record. When the host 501 receives the updated path record, the host 501 can perform necessary host reconfiguration 503 on network connections such as QPs 511. For example, the host 501 can cycle through all of its active QPs 511. If there are any differences, the QP is reconfigured. There are several QP attributes that can be changed during host reconfiguration such as link width, maximum transfer unit, and service level.

Thus, the three-way hybrid handshake approach is a combination of the three-way wildcard handshake and the repath-only signaling methods where the three-way handshaking is combined with a PRD in the SM to minimize unnecessary overhead.

Furthermore, a single fault in the network can cause a large number of path record changes, e.g. using the LASH routing algorithm. The repath trap approach may require a large number of events to be sent to each host stack, since the repath trap approach can only encapsulate a single path record at a time. Thus, the management message overhead for the three-way hybrid handshake approach can be less than the overhead for the repath-only approach due to that, in the three-way hybrid handshake approach, the subnet manager can send multiple path records in-bulk to the host stack in a handshaking message.

In accordance with an embodiment of the invention, the three-way hybrid handshake mechanism can be implemented in two separate stages: a first stage for identifying path record changes (Algorithm 2) and a second part for triggering wildcard repath trap (Algorithm 3).

| Algorithm 2 Identify path record changes |
| --- |
| 1:     if never_been_routed = = TRUE then |
| 2:        for $sw_{src}$ = 0 to max_switches do |
| 3:           for $sw_{dst}$ = 0 to max_switches do |
| 4:              OLD_VL[$sw_{src}$][$sw_{dst}$] = VL[$sw_{src}$][$sw_{dst}$] |
| 5:           end for |
| 6:        end for |
| 7:     else |
| 8:        for $sw_{src}$ = 0 to max_switches do |
| 9:           for $sw_{dst}$ = 0 to max_switches do |
| 10:             if $sw_{src}$ != $sw_{dst}$ AND OLD_VL[$sw_{src}$][$sw_{dst}$] != VL[$sw_{src}$][$sw_{dst}$] then |
| 11:                increment(path_changes) |
| 12:                OLD_VL[$sw_{src}$][$sw_{dst}$] = VL[$sw_{src}$][$sw_{dst}$] |
| 13:             end if |
| 14:           end for |
| 15        end for |
| 16:    end if |

| Algorithm 3 Trigger wildcard repath trap |
| --- |
| 1:     if path_changes > 0 then |
| 2:        trigger _wildcard(repath _trap) |
| 3:        clear(path_changes) |
| 4:     end if |

As shown in the above, Algorithm 2 compares all the path record changes for every source/destination address pair and implements a path_changes variable if there is a difference. Subsequently, Algorithm 3 can use the path_changes variable, which is assigned in Algorithm 2, to determine whether a wildcard repath trap can be forwarded to every host. Afterwards, each host requests the updated path records and reconfigures the QPs accordingly.

In accordance with an embodiment of the invention, the signaling methods can be implemented and evaluated using OpenSM, a subnet manager which is bundled together with OFED. These different signaling methods can be implemented based on OpenSM and notify the host stack about network events. These events can help the host stack to decide whether it is required to reconfigure the path SLs in any of its existing QPs.

The network reconfiguration in an IB network can be based on the reconfiguration mechanism in OpenSM. The reconfiguration mechanism in OpenSM may only tell when rerouting is started and when it is finished. In addition, OpenSM may not maintain information about what paths have been changed.

During normal operation, OpenSM performs periodic light sweeps of the network to check for topology changes. If a change is discovered either during a light sweep or through the reception of trap 128 (port state changed) or trap 144 (change capability mask) a network reconfiguration is triggered. The reconfiguration process is responsible for the rerouting of the network which is performed in order to guarantee full connectivity, deadlock freedom, and proper load balancing between all source and destination pairs. When the network reconfiguration is complete OpenSM enters the signaling phase described in the next section.

The hosts can be notified about the changes when the system has reconfigured the network. The signaling mechanisms can follow the general trapping concept in IB, using traps, notices, and event forwarding. The OpenSM can generate an unpath trap whenever it invalidates a path and generate a repath trap when the path is recreated, assuming that the end nodes subscribe to these traps at network initialization time.

In accordance with an embodiment of the invention, support for generating and subscribing to a trap can be added to OpenSM and to the IB stack at the host, since the OpenSM lacks the functionality for identifying individual path changes. The system may only send the repath trap whenever the SM has completed a rerouting phase, i.e. the repath trap tells the hosts that the network has been reconfigured and the host should check if it needs to update any of its QPs. Also, the system can use the repath trap to signal the nodes.

Host Reconfiguration

In accordance with an embodiment of the invention, the QP and the address handle are the host-side entities that are reconfigured for host side dynamic reconfiguration, whenever the subnet configuration changes. When a host receives a repath trap, it knows that the network is reconfigured and can query the SM for the updated path record. When the host receives the updated path record, it can cycle through all its active QPs and compare the updated path record with the current path properties. If there are any differences the QP is reconfigured. There are many QP attributes that can be changed during host reconfiguration such as link width, maximum transfer unit, and service level. What attributes to update depends on the properties of the routing algorithm and on the usage scenario. For example, the system can update the service level assigned to a given <source, destination> pair by the routing algorithm in order to avoid deadlock after rerouting, or to update any QP attributes. Additionally, the system can keep track of the active QPs within a HCA. All active QPs can be stored in a linked list when they are created and removed from this list when they are destroyed.

Figure 6:
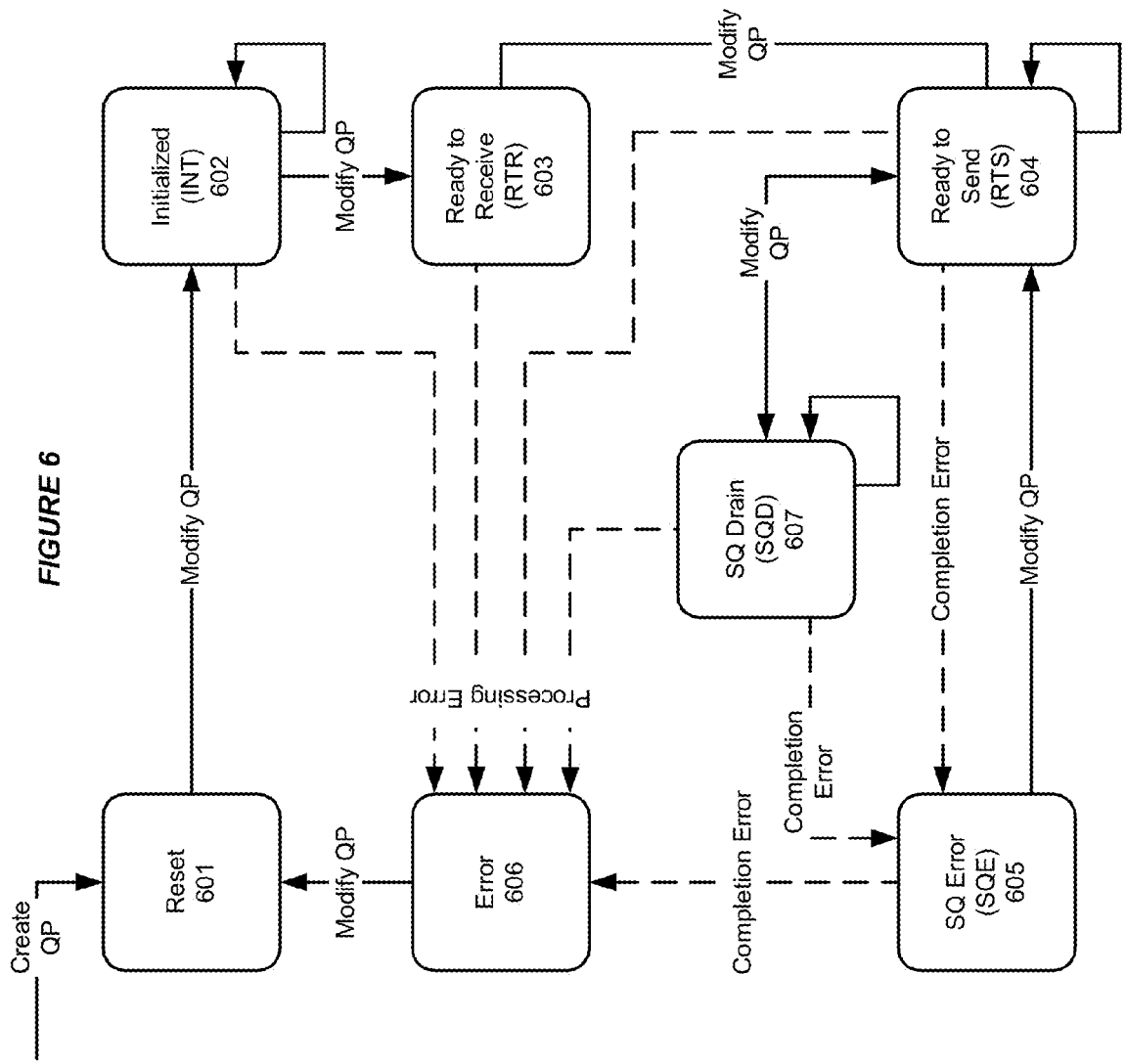
FIG. 6 shows an illustration of a Queue Pair (QP) state diagram in a middleware machine environment, in accordance with an embodiment of the invention.

FIG. 6 shows an illustration of a QP state diagram in a middleware machine environment, in accordance with an embodiment of the invention. As shown in FIG. 6, a QP can have different states in its life cycle: a Reset state 601, a Initialized (INT) state 602, a Ready to Receive (RTR) state 603, a Ready to Send (RTS) state 604, a SQ Error (SQE) state 605, and a Error state 606. Additionally, there can be one additional state: SQ Drain (SQD) state 607. All states in the QP state diagram are allowed to move directly to the reset state.

In accordance with an embodiment of the invention, there are several ways to achieve actual reconfiguration of the QP path information. Different ways to reconfigure the QP path information (remote address vector) can have different impact on the upper layer protocols.

The first approach is to reset Queue Pair. After a QP is created, the QP goes through the RESET-INIT-RTR-RTS state sequence. The QP is considered fully operational only when the QP has reached the RTS state 604, and the QP may not be changed in this state. If an error occurs, the QP is moved to the SQE 605 or ERROR 606 state and communication is disrupted. One way to reconfigure the QP is to recreate the QP, i.e. repeat the full reset cycle RESET-INIT-RTR-RTS which can be done at any time by doing the RTS-RESET transition.

Using the first approach, all existing QPs are stored before the QP enters the RESET state. Only then can the remote address vector of a QP be updated. Additionally, when a QP is moved to the RESET state, the SQ and CQ may be cleared and loss of data may happen. As this loss is not handled by the QP, it is up to the upper layer protocols to handle it. Thus, it may not be possible to perform an application transparent host reconfiguration using this approach.

A second approach is to move the QP into the SQD state 607, with the assumption that the remaining elements in the SQ are able to be executed successfully before the state transition. Then, when in the SQD state, the host can be reconfigured with the updated path information before returning to the RTS state.

This mechanism works when the system can drain the SQ, i.e. when the transition from RTS to SQD is a success. The drain of the SQ may not success if there are outstanding operations and the current path is not operational. A mode may be useful to avoid the QP going to the full error state when unsuccessful. Additionally, the SQD state may not be supported by the firmware for some hardware.

A third approach is to use the automatic path migration (APM) mechanism provided by IB. APM can automatically switch from a primary path to an alternative path when a fault happens without destroying the established connection. The APM mechanism can support fast switching to a pre-calculated backup path in the case of failure. For dynamic host reconfiguration, the system can use APM as a mechanism to switch the remote address vector manually, i.e. the system may not use a pre-calculated path but reconfigure a path based on network reconfiguration.

Figure 7:
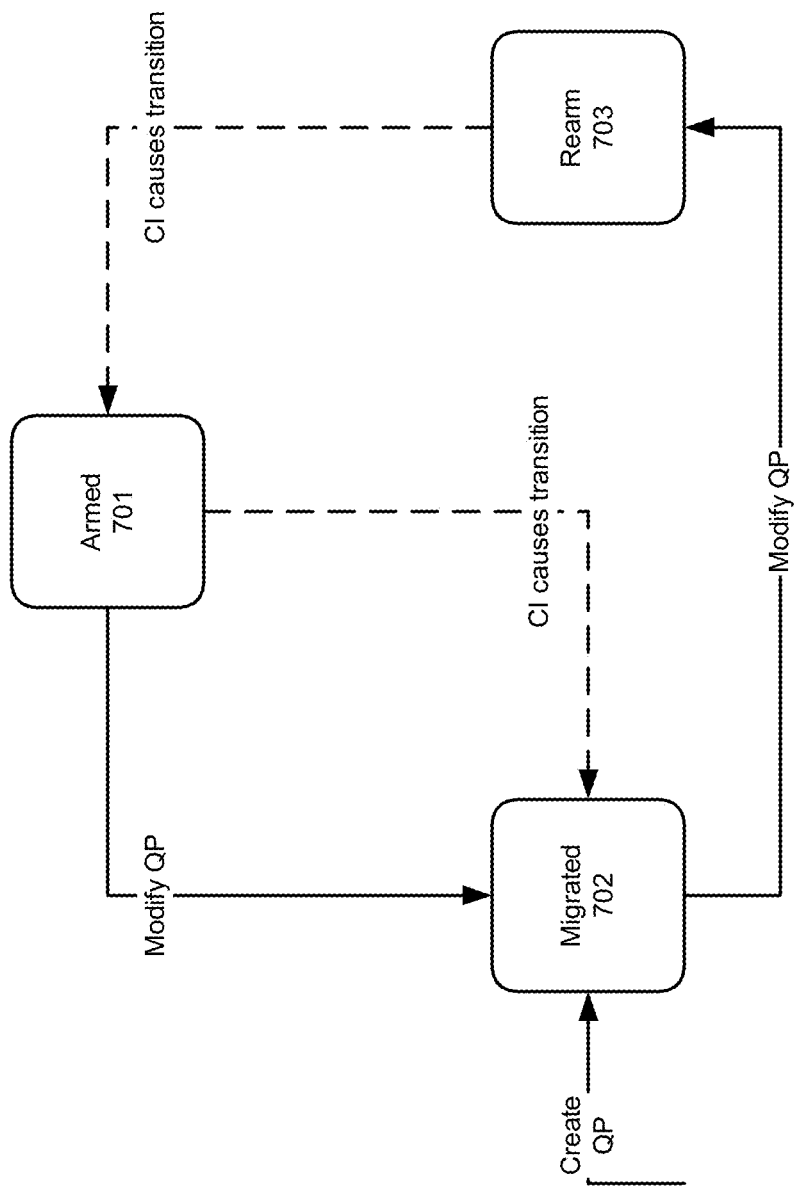
FIG. 7 shows an illustration of an automatic path migration (APM) state diagram for a QP in a middleware machine environment, in accordance with an embodiment of the invention.

FIG. 7 shows an illustration of an APM state diagram for a QP in a middleware machine environment, in accordance with an embodiment of the invention. The APM state diagram as shown in FIG. 7 is in relation to the QP state diagram as shown in FIG. 7. When the QP is in the RTS 604 state, the QP is also allowed to be in one of the APM states: a ARMED state 701, a MIGRATED state 702, and a REARMED state 703. Thus, the QP can make a transition in the APM state diagram without disrupting the connection, which allows the system to modify the QP while the QP is in the RTS state.

In order to modify the QP, the system can first make a manual transition from the MIGRATED state 702 to the REARMED state 703. Then, the address vector of the alternative path is updated with the new path information. Finally, the alternative path is switched over to become the primary path and the QP state is manually switched back to the MIGRATED state 702 (REARMED-ARMED-MIGRATED). With this approach the system can dynamically reconfigure the host in an application transparent manner without disrupting the connection.

In accordance with an embodiment of the invention, it is preferable to use the APM to reconfigure the QP pairs on the host side, since it can automatically switch from a primary path to an alternative path when a fault happens without destroying the established connection.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for providing fault tolerance in a middleware machine environment, comprising:
   identifying, via a subnet manager, an update in a path record, wherein the update is caused by a network configuration triggered by a fault or change in a subnet in a middleware machine environment, wherein the path record is a data structure including information for establishing a queue pair for communication between nodes in the subnet;
   signaling, via the subnet manager, an event indicating the subnet has been reconfigured, to a node in the subnet, wherein the node queries the subnet manager or a database associated therewith for the updated path record; and
   providing, via the subnet manager, the updated path record to the node;
   wherein the node uses the updated path record to reconfigure the node.

2. The method according to claim 1, wherein the updated path record is identified by comparing path records before the network reconfiguration and path records after the network reconfiguration.

3. The method according to claim 1, wherein the event indicating the subnet has been reconfigured is sent to each node in the middleware machine environment.

4. The method according to claim 1, wherein the network reconfiguration is performed to guarantee full connectivity in the middleware machine environment.

5. The method according to claim 1, wherein the subnet manager uses one or more subnet management agents to monitor for network changes and reconfigures the network based on the changes.

6. The method according to claim 1, wherein the event indicating the subnet has been reconfigured is sent to nodes that have explicitly subscribed to a message that has been defined for the event.

7. The method according to claim 1, wherein reconfiguring the node includes at least one of
   resetting one or more queue pairs, draining one or more send queues of the queue pairs to update path information, and switching from a primary path to an alternative path.

8. The method of claim 7, wherein reconfiguring the node further includes changing one or more attributes of a queue pair, including link width, maximum transfer unit, and service level.

9. The method of claim 1, wherein the node detects one or more differences between the updated path record and current path properties of the node by cycling through the node's active queue pairs and comparing the updated path record with the current path properties of the node, and reconfigures the queue pairs based on the differences.

10. A non-transitory computer readable storage medium having instructions stored thereon that when executed cause a system to perform the steps comprising:

identifying, via a subnet manager, an update in a path record, wherein the update is caused by a network configuration triggered by a fault or change in a subnet in a middleware machine environment, wherein the path record is a data structure including information for establishing a queue pair for communication between nodes in the subnet;

signaling, via the subnet manager, an event indicating the subnet has been reconfigured, to a node in the subnet, wherein the node queries the subnet manager or a database associated therewith for the updated path record; and providing, via the subnet manager, the updated path record to the node;

wherein the node uses the updated path record to reconfigure the node.

11. The non-transitory computer readable storage medium of claim 10, wherein the updated path record is identified by comparing path records before the network reconfiguration and path records after the network reconfiguration.

12. The non-transitory computer readable storage medium of claim 10, wherein the event indicating the subnet has been reconfigured is sent to each node in the middleware machine environment.

13. The non-transitory computer readable storage medium of claim 10, wherein the network reconfiguration is performed to guarantee full connectivity in the middleware machine environment.

14. The non-transitory computer readable storage medium of claim 10, wherein the subnet manager—uses one or more subnet management agents to monitor for network changes and reconfigures the network based on the changes.

15. The non-transitory computer readable storage medium of claim 10, wherein the event indicating the subnet has been reconfigured is sent to nodes that have explicitly subscribed to a message that has been defined for the event.

16. The non-transitory computer readable storage medium of claim 10, wherein reconfiguring the node includes at least one of resetting one or more queue pairs, draining one or more send queues of the queue pairs to update path information, and switching from a primary path to an alternative path.

17. A system to provide fault tolerance in a middleware machine environment, comprising:

one or more microprocessors;

at least one host in the middleware machine environment; and a subnet manager running on the one or more microprocessors, wherein the subnet manager is configured to perform the steps comprising identifying an update in a path record, wherein the update is caused by a network configuration triggered by a fault or change in a subnet in a middleware machine environment, wherein the path record is a data structure including information for establishing a queue pair for communication between nodes in the subnet;

signaling an event indicating the subnet has been reconfigured, to a node in the subnet, wherein the node queries the subnet manager or a database associated therewith for the updated path record, and providing the updated path record to that node;

wherein the node uses the updated path record to reconfigure the node.

18. The system of claim 17, wherein the updated path record is identified by comparing path records before the network reconfiguration and path records after the network reconfiguration.

19. The system of claim 17, wherein the event indicating the subnet has been reconfigured is sent to each node in the middleware machine environment.

20. The system of claim 17, wherein the network reconfiguration is performed to guarantee full connectivity in the middleware machine environment.

* * * * *

UNITED STATES PATENT AND TRADEMARK OFFICE
CERTIFICATE OF CORRECTION

PATENT NO. : 8,880,932 B2  
APPLICATION NO. : 13/649689  
DATED : November 4, 2014  
INVENTOR(S) : Guay et al.

Page 1 of 1

It is certified that error appears in the above-identified patent and that said Letters Patent is hereby corrected as shown below:

In the Specification

In column 1, lines 41-42, delete "Forschungszentrum Juelich's" and insert -- Forschungszentrum Jülich --, therefor.

In column 9, line 4, delete "he" and insert -- be --, therefor.

In column 9, lines 53-54, delete "MTGRATED)." and insert -- MIGRATED). --, therefor.

Signed and Sealed this  
Sixteenth Day of June, 2015

Michelle K. Lee  
*Director of the United States Patent and Trademark Office*